US010299630B2

(12) United States Patent
Chung

(10) Patent No.: US 10,299,630 B2
(45) Date of Patent: May 28, 2019

(54) VACUUM MIXER AND OPERATION METHOD THEREFOR

(71) Applicant: CTMC CO., LTD., Ansan-Si (KR)

(72) Inventor: Myounghwa Chung, Suwon-si (KR)

( * ) Notice: Subject to any disclaimer, the term of this patent is extended or adjusted under 35 U.S.C. 154(b) by 69 days.

(21) Appl. No.: 15/305,796

(22) PCT Filed: Apr. 10, 2015

(86) PCT No.: PCT/KR2015/003610
§ 371 (c)(1),
(2) Date: Oct. 21, 2016

(87) PCT Pub. No.: WO2015/194750
PCT Pub. Date: Dec. 23, 2015

(65) Prior Publication Data
US 2017/0086622 A1 Mar. 30, 2017

(30) Foreign Application Priority Data

Jun. 18, 2014 (KR) .................. 10-2014-0074068
Nov. 25, 2014 (KR) .................. 10-2014-0165556

(51) Int. Cl.
*A47J 43/046* (2006.01)
*A47J 43/07* (2006.01)

(52) U.S. Cl.
CPC ............. *A47J 43/046* (2013.01); *A47J 43/07* (2013.01); *A47J 43/0716* (2013.01)

(58) Field of Classification Search
CPC .................................................. A47J 43/046
(Continued)

(56) References Cited

U.S. PATENT DOCUMENTS 2,516,436 A * 7/1950 Walker .................... B28C 5/464
134/177
2004/0173105 A1* 9/2004 Kim ........................ A47J 43/06
99/472

(Continued)

FOREIGN PATENT DOCUMENTS

| CN | 201119801 | 9/2008 |
| CN | 103720339 | 4/2014 |
| CN | 103857317 | 6/2014 |
| EP | 2716187 | 4/2014 |

(Continued)

*Primary Examiner* — David L Sorkin
(74) *Attorney, Agent, or Firm* — Antonio Ha & U.S. Patent, LLC

(57) ABSTRACT

An object of the present invention is to provide a vacuum blender configured to enhance convenience by integrating a vacuum device into the main body of the blender and to separate/store food while maintaining a storage container in a vacuum state by dualizing the vacuum space, and a method for operating the same. The object of the present invention can be achieved by providing a vacuum blender comprising: a mechanical operator 200 comprising a main body 210 provided with an internal space, a vacuum pump 230 and a rotary motor 240, the vacuum pump 230 and the rotary motor 240 being installed in the internal space of the main body 210; a supporter 300 configured to allow a vacuum tube 320 connected with the vacuum pump 230 to pass therethrough, the supporter 300 being formed to rise to a certain height from the mechanical operator 200; a vacuum depressurizer 400 arranged at an upper portion of the supporter 300 and provided therein with a first vacuum chamber 450 connected with the vacuum tube 320, the first vacuum chamber 450 being configured such that upper and lower portions thereof communicate with an outside, and the upper portion of the first vacuum chamber 450 is a selectively opened and closed by a first vacuum plug 430; and a vacuum chopper 500 comprising a storage container 510 seated on the mechanical operator 200 and provided with a second vacuum chamber 580 formed therein and a blender blade 515 mounted thereto and connected with the rotary (Continued)

motor 240, and a seal cover 530 sealably placed on the storage container 510 and provided with a second vacuum plug 540 installed at a portion of the seal cover 530 sealably connected with a lower portion of the first vacuum chamber 450 of the vacuum depressurizer 400 such that the second vacuum plug 540 is selectively opened and closed.

11 Claims, 10 Drawing Sheets

(58) Field of Classification Search
USPC .................................. 366/139, 205, 314
See application file for complete search history.

(56) References Cited

U.S. PATENT DOCUMENTS

| 2014/0137750 A1 | 5/2014 | Arai et al. |
| 2015/0201808 A1 | 7/2015 | Katsuki et al. |

FOREIGN PATENT DOCUMENTS

| JP | 2008-205907 | 9/2008 |
| JP | 2008-206907 | 9/2008 |
| JP | 2013-111079 | 6/2013 |
| KR | 10-2003-0028105 | 4/2003 |
| KR | 2003-0028105 | 4/2003 |
| KR | 20-0395836 | 9/2005 |
| KR | 10-1221946 | 1/2013 |
| KR | 10-2014-0044736 | 4/2014 |
| KR | 2014-0044736 | 4/2014 |
| WO | 2014-054301 | 4/2014 |
| WO | WO2014054301 | 4/2014 |

* cited by examiner

VACUUM MIXER AND OPERATION METHOD THEREFOR

TECHNICAL FIELD

The present invention relates to a vacuum blender and an operating method therefor. More particularly, the present invention relates to a vacuum blender capable of mixing foods such as fruits and vegetables in a vacuum state and an operating method therefor.

BACKGROUND ART

A blender is one of electrical appliances which are most frequently used in the home today. The blender chops foods such as fruits, vegetables and cereal into small pieces which can be ingested.

Once a food to be chopped is put in a storage container of the blender and the container is closed with a lid, the motor is driven at a high speed to rotate blades. In this process, a lot of bubbles are formed as grains of the chopped food are mixed with air in the storage container. When fruits such as bananas or tomatoes are put in the blender and chopped, a large amount of bubbles is generated over the fruit juice. The generated bubbles not only means that taste and texture of the fruit juice is lowered when the fruit juice is ingested and that a considerable portion of nutrients in the fruit has been destroyed as fibers in the fruit are oxidized in the chopping process.

In addition, if the chopped food is kept exposed in the air rather than being ingested immediately after being chopped, oxidization of the food further proceeds, which accelerates disruption of the fiber and nutrients, discolors the food along with degradation of freshness of the food, and results in separation of the food and air into layers. Thus, once a food is chopped by the blender, it is difficult to keep the chopped food for a long time without ingesting the food.

A vacuum blender capable of chopping foods in a vacuum space has been developed to solve the aforementioned problem. An example of the vacuum blender is disclosed in Japanese Patent Application Publication No. 2013-111079 (High-speed vacuum stirring method for bubble-free fruit juice/food, and mixer for the same) (Reference 1). According to the vacuum mixer of this document, a mixer drum is covered by a seal lid, a vacuum throat provided to the seal lid is connected with a selector valve, an intake valve, a vacuum pump and a pressure gauge via a vacuum tube.

According to a method for operating the vacuum mixer, a food is put in the mixer drum and then the seal lid is put on the drum. Then, the air is discharged from the drum through the vacuum throat connected to the seal lid. Then, the selector valve is operated to connect the seal lid and the vacuum pump. When a vacuum pressure less than or equal to 300 mbar is obtained, the motor of the mixer operates to stir the food. Once the stirring operation is completed, the vacuum pump is stopped and the intake valve opens to release the vacuum condition and allow the seal lid to be easily separated.

However, such vacuum mixer needs to employ a vacuum device configured by connecting various components such as a vacuum pump, a selector valve, an intake valve and a pressure gauge on the outside of a typical mixer in a complex manner. Accordingly, it is very inconvenient to operate the mixer. Moreover, after the mixer is used, the vacuum device needs to be separated from the mixer and stored separately, which causes inconvenience.

Moreover, with such vacuum mixer, the intake valve begins to open to introduce air into the mixer drum as soon as the operation of the vacuum pump is stopped. Accordingly, the chopped food cannot be left in the drum in a vacuum state for a long time.

DISCLOSURE

Technical Problem

An object of the present invention devised to solve the problem of the conventional vacuum mixer is to provide a vacuum blender configured to enhance convenience by integrating a vacuum device into the main body of the blender and to separate/store food while maintaining a storage container in a vacuum state by dualizing the vacuum space, and a method for operating the same.

Technical Solution

The object of the present invention can be achieved by providing a vacuum blender comprising: a mechanical operator comprising a main body provided with an internal space, a vacuum pump and a rotary motor, the vacuum pump and the rotary motor being installed in the internal space of the main body; a supporter configured to allow a vacuum tube connected with the vacuum pump to pass therethrough, the supporter being formed to rise to a certain height from the mechanical operator, a vacuum depressurizer arranged at an upper portion of the supporter and provided therein with a first vacuum chamber connected with the vacuum tube, the first vacuum chamber being configured such that upper and lower portions thereof communicate with an outside, and the upper portion of the first vacuum chamber is a selectively opened and closed by a first vacuum plug; and a vacuum chopper comprising a storage container seated on the mechanical operator and provided with a second vacuum chamber formed therein and a blender blade mounted thereto and connected with the rotary motor, and a seal cover sealably placed on the storage container and provided with a second vacuum plug installed at a portion of the seal cover sealably connected with a lower portion of the first vacuum chamber of the vacuum depressurizer such that the second vacuum plug is selectively opened and closed.

A pressure sensor may be installed on the vacuum tube.

The supporter may be installed such that a vertical length thereof is adjustable by a vertical connector.

The vacuum depressurizer may be pivotably coupled to an upper end of the supporter using a hinge.

A grip may be attached to an upper portion of the first vacuum plug to allow the first vacuum plug to be manually opened and closed. The vacuum depressurizer may be provided with an installation hole allowing the first vacuum plug to be inserted thereinto and one or more intake holes arranged around the installation hole and selectively opened and closed by the first vacuum plug.

A depressurizer packing may be mounted to a lower portion of the vacuum depressurizer communicating with the outside so as to closely contact the seal cover.

A grip allowing the second vacuum plug to be manually opened and closed may be attached to an upper portion of the second vacuum plug. The seal cover may be provided with an installation hole allowing the second vacuum plug to be inserted thereinto and one or more intake holes arranged around the installation hole and selectively opened and closed by the second vacuum plug.

A step may be formed on an inner side of an upper portion of the storage container, and a first cover packing may be mounted to a lower portion of the seal cover so as to closely contact a horizontal surface of the step.

A second cover packing may be mounted to the lower portion of the seal cover and positioned above the first cover packing so as to closely contact inner upper and lower surfaces of the storage container.

In accordance with another aspect of the present invention, provided herein is a method for operating a vacuum blender comprising: depressurizing an interior of a sealed storage container using a vacuum pump; determining whether a pressure in the storage container has reached a first depressurization level; continuing to operate the vacuum pump when the pressure in the storage container has reached the first depressurization level as a result of the determining; determining whether the pressure in the storage container has reached a second depressurization level or whether a predetermined depressurization time has been reached after the first depressurization level is reached; stopping operation of the vacuum pump when the pressure in the storage container reaches the second pressurization level or when the depressurization time is reached as a result of the determining; and chopping a food by vxcxcfit5y76rotating a blender blade installed in the storage container.

The first depressurization level may be −40 KPa, and the second depressurization level may be −70 KPa.

The method may further comprise displaying an error message when the first depressurization level has not been reached.

The stopping and the chopping may be performed stepwise by an input of a separate control signal. On the contrary, the stopping and the chopping may be performed continuously without an input of a separate control signal.

Advantageous Effects

According to a vacuum blender and an operation method therefor configured as above according to the present invention, foods such as fruits and vegetables may be chopped in vacuum state. Accordingly, fibers and nutrients in the foods may be prevented from being destroyed by oxidization of the foods.

In addition, while the blender operates, formation of a large amount of bubbles by contact with air is prevented. Accordingly, taste and texture of the food may be enhanced when the food is ingested.

In addition, the storage container may be separated from the blender in a vacuum state by forming a dual vacuum space. Thereby, the chopped food may be kept for a long time with freshness thereof maintained.

Moreover, when the interior of the storage container of the blender is depressurized it is determined whether the pressure in the blender has reached a certain depressurization level. If the certain depressurization level has not been reached, an error message is transmitted. Thereby, the vacuum pump is prevented from continuing to operate without the container sealed.

BEST MODE

A detailed description of preferred embodiments of the present invention will be given with reference to the accompanying drawings.

The embodiments will be described sufficiently to allow those skilled in the art to practice the present invention. It should be understood that the embodiments of the present invention are not necessarily mutually exclusive. For example, a specific shape, structure and property of one embodiment may be implemented in another embodiment without departing from the spirit and scope of the present invention. It should be understood that positions or disposition of individual constituents disclosed in each embodiment can be changed without departing from the spirit and scope of the present invention.

Accordingly, the detailed descriptions given below are subpoenas with him and are not intended to limit the present invention. The scope of the present invention is in the defined only by the appended claims and equivalents thereof. Wherever possible, like reference numbers will be used throughout the drawings to refer to the same or like functions in several aspects.

Figure 1:
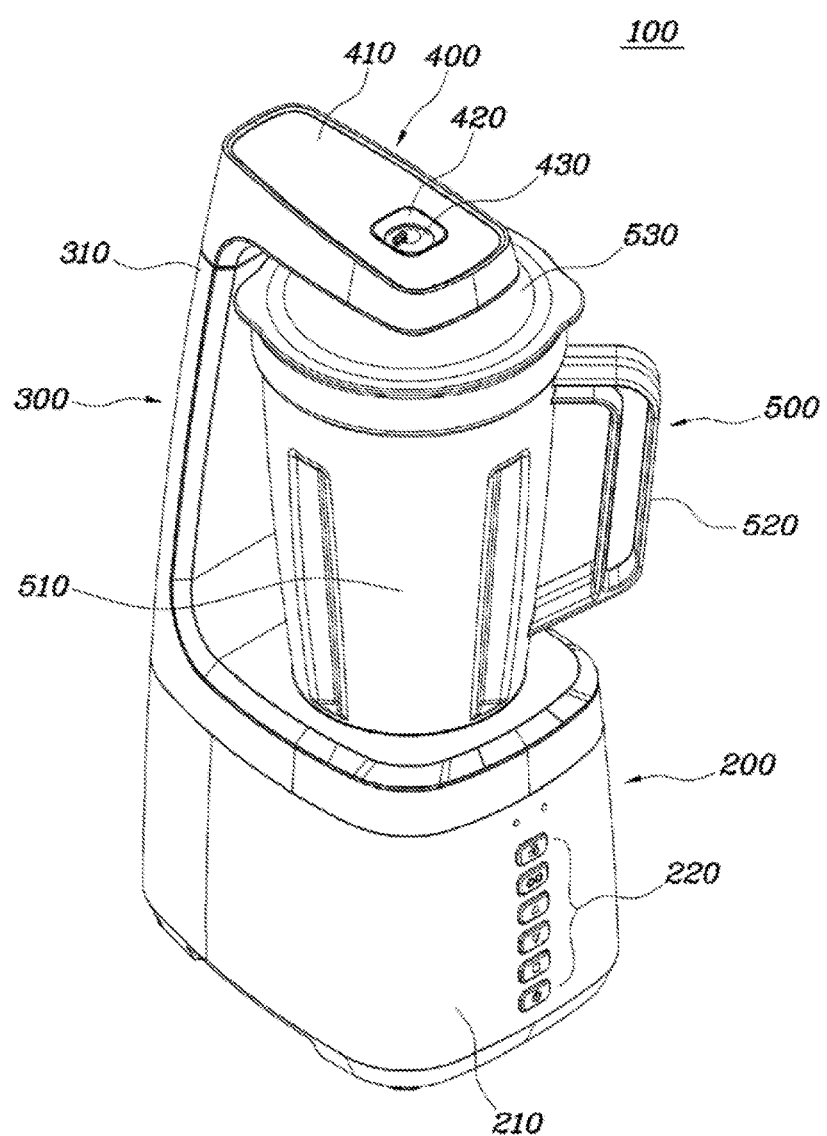
FIG. 1 is an overall perspective view of a vacuum blender according to an embodiment of the present invention.
Figure 2:
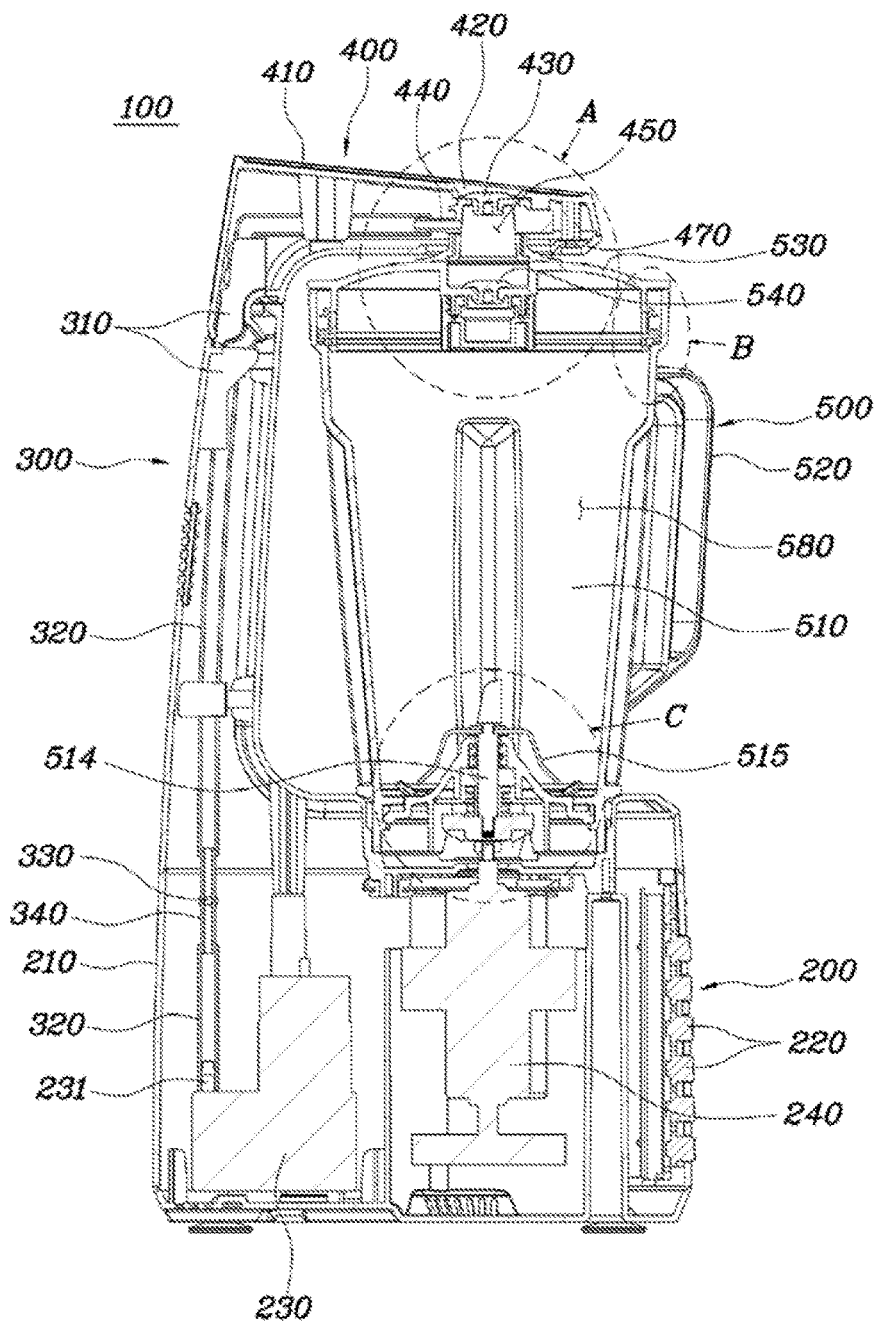
FIG. 2 is an overall cross-sectional view of the vacuum blender according to the present invention.
Figure 3:
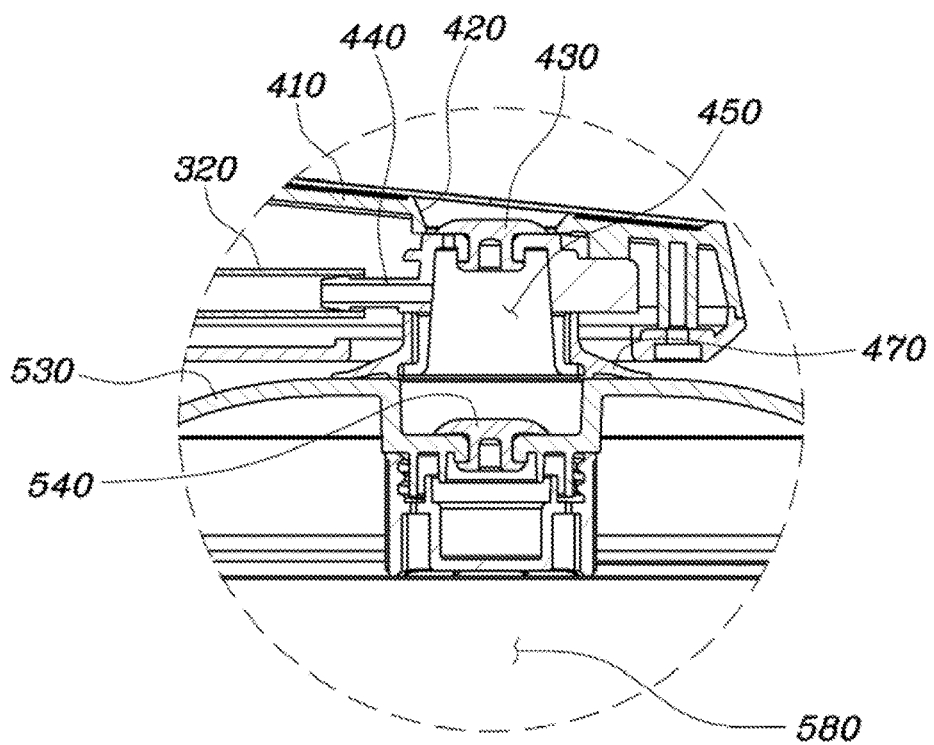
FIG. 3 is a partial cross-sectional view illustrating a vacuum depressurizer according to the present invention.
Figure 4:
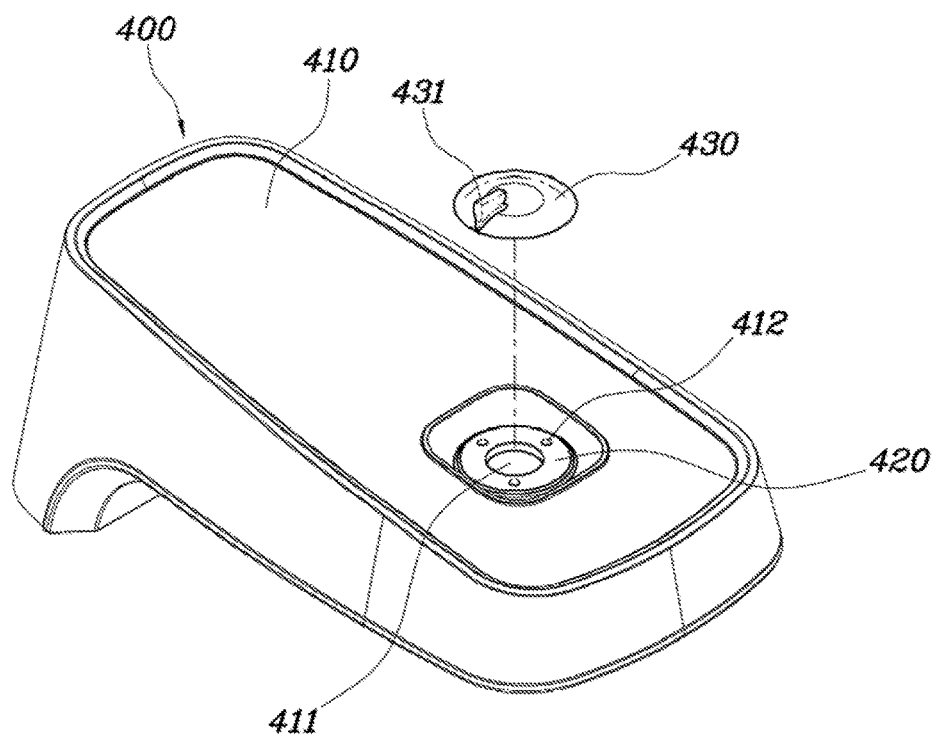
FIG. 4 is a perspective view illustrating the vacuum depressurizer according the present invention.
Figure 5:
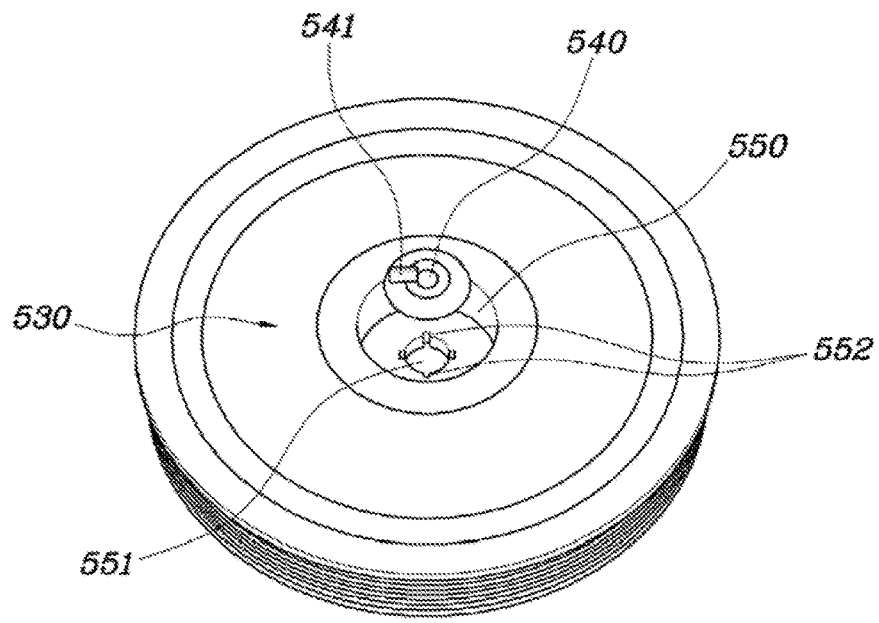
FIG. 5 is a perspective view illustrating a seal lid according to an embodiment of the present invention.
Figure 5:
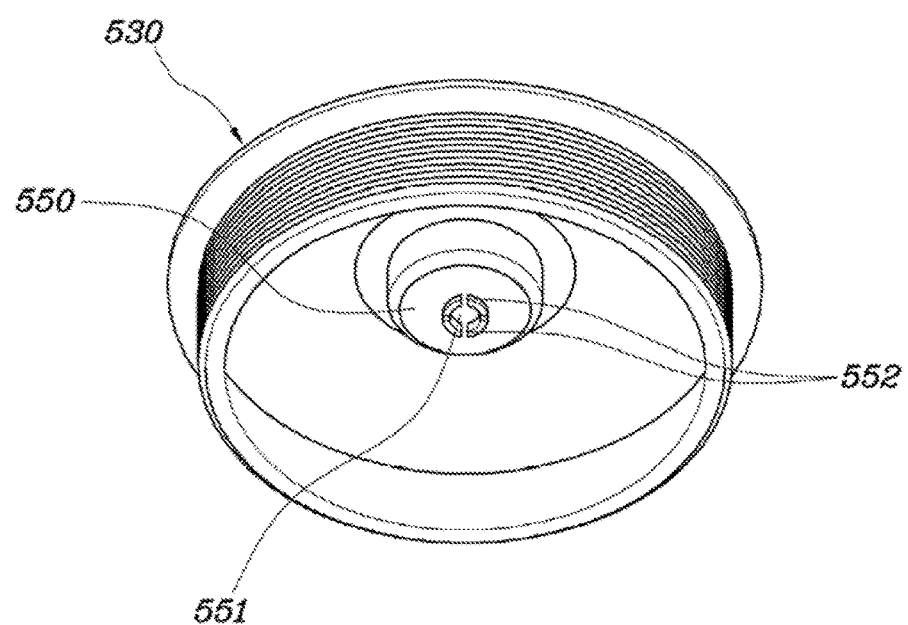
Figure 6:
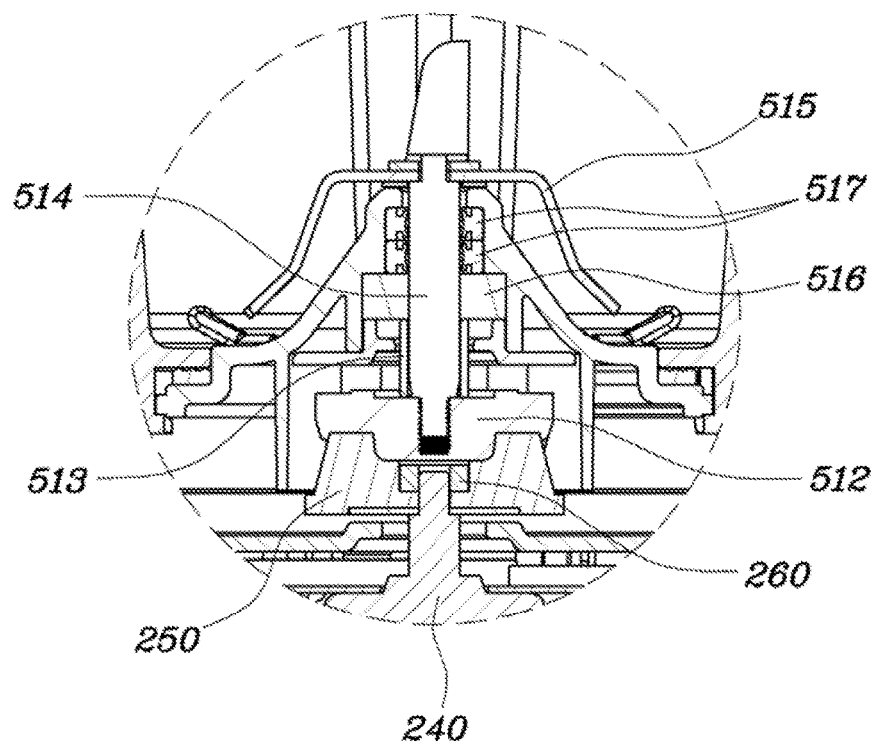
FIG. 6 is a partial cross-sectional view illustrating a packing part of the seal cover according to the present invention.
Figure 7:
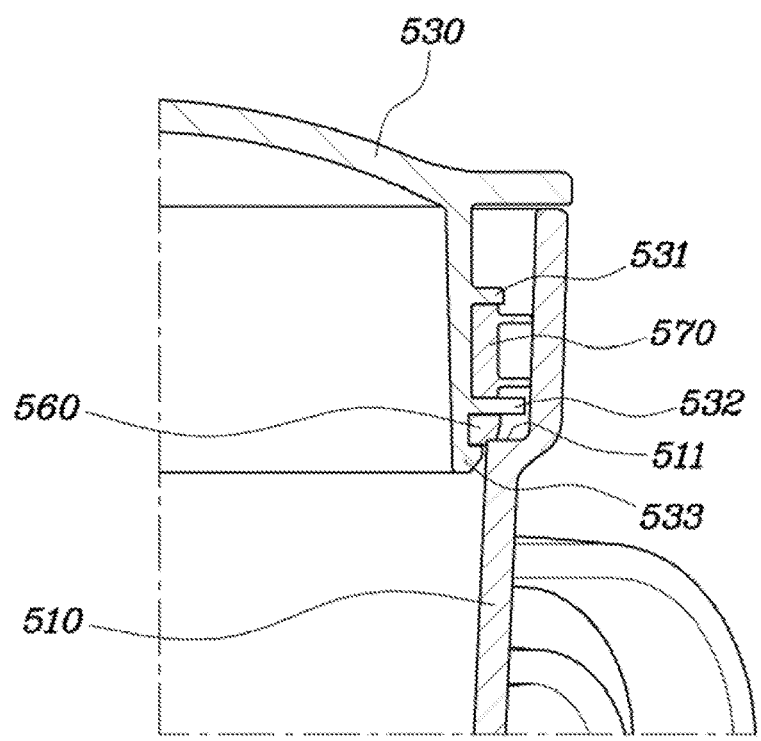
FIG. 7 is a partial cross-sectional view illustrating a mechanical operator according to the present invention.
Figure 8:
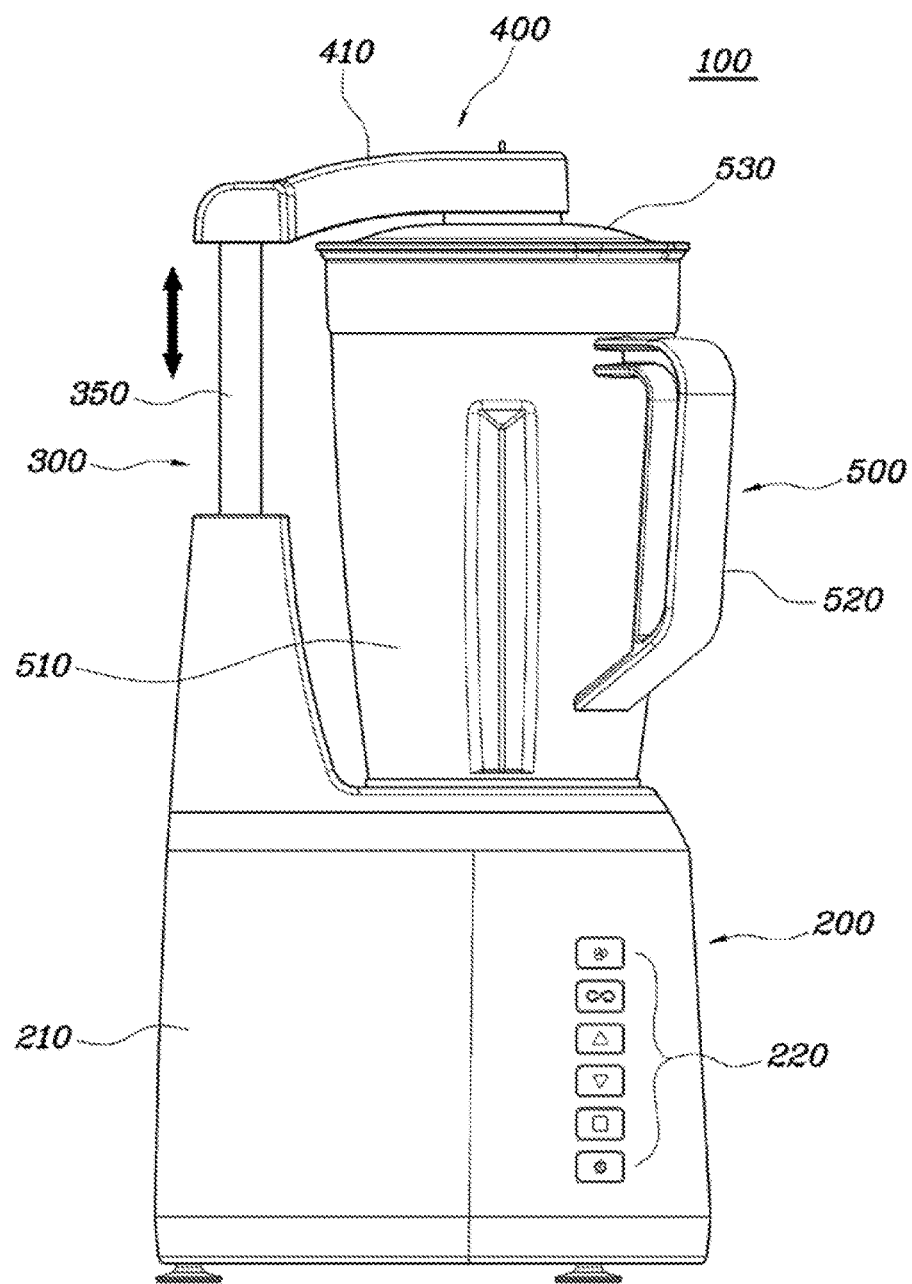
FIG. 8 is a plan view illustrating a vacuum blender according to another embodiment of the present invention.
Figure 9:
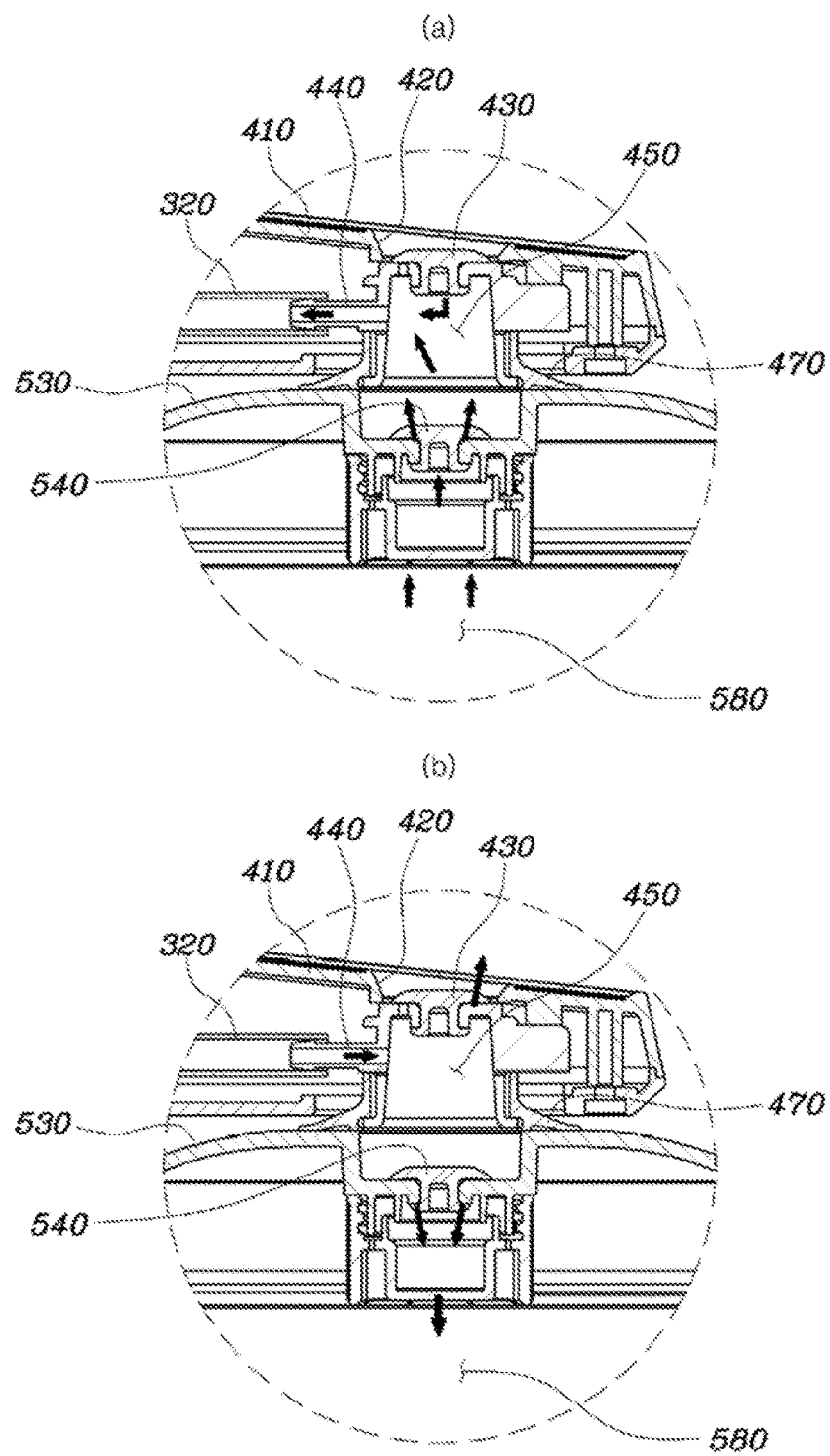
FIG. 9 is a partial cross-sectional view illustrating operation of the vacuum depressurizer according to the present invention.

FIG. 1 is an overall perspective view of a vacuum blender according to an embodiment of the present invention, and FIG. 2 is an overall cross-sectional view of the vacuum blender according to the present invention. FIG. 3 is an expanded, partial cross-sectional view of part "A" of FIG. 2, and FIG. 4 is a perspective view illustrating a vacuum depressurizer. FIG. 5 is a perspective view illustrating a seal lid. FIG. 6 is an expanded, partial cross-sectional view of part "B" of FIG. 2, and FIG. 7 is an expanded, partial cross-sectional view of part "C" of FIG. 2. FIG. 8 is a plan view illustrating a vacuum blender according to another embodiment of the present invention, and FIG. 9 is a partial cross-sectional view illustrating operation of the vacuum depressurizer according to the present invention.

A vacuum blender 100 according to an embodiment of the present invention includes a mechanical operator 200 equipped with mechanical components for the vacuuming and chopping operations, a supporter 300 extending from the mechanical operator 200 to a certain height to provide a space in which a storage container 510 can be seated on the mechanical operator 200, a vacuum depressurizer 400 extending horizontally from the supporter 300 and provided with a constituent for vacuum depressurization, and a vacuum chopper 500 installed between the mechanical operator 200 and the vacuum depressurizer 400 to chop a contained food in a vacuum state.

The mechanical operator 200 includes a main body 210 provided with an internal space, a vacuum pump 230 and a rotary motor 240. The vacuum pump 230 and the rotary motor 240 are installed in the internal space of the main body 210.

The main body 210 is provided with a series of operation buttons 220 exposed to the outside of the main body 210 and manipulated by the user to perform various functions. In addition, the upper end of the main body 210 is provided with a seating surface on which the storage container 510 can be placed in an operative connection with the mechanical operator 200.

The vacuum pump 230 is connected with a vacuum tube 320 which extends to the supporter 300 and the vacuum depressurizer 400. Accordingly, the vacuum pump 230 is preferably arranged adjacent to the supporter 300. Since the rotary motor 240 needs to be operatively connected with a blender blade 515 installed in the storage container 510, the rotary motor 240 is preferably arranged adjacent to the storage container 510. Connection between the rotary motor 240 and the blender blade 515 of the storage container 510 will be described with reference to FIG. 6 later.

An intake nozzle 231 is provided on one side of the vacuum pump 230. The vacuum tube 320 is installed at the intake nozzle 231 so as to extend to the vacuum depressurizer 400 through the interior of the supporter 300. To this end, the supporter 300 is provided with a space in which at least the vacuum tube 320 can be accommodated.

A pressure sensor 330 may be installed on the vacuum tube 320 to check the vacuum state in the vacuum tube 320. Since the vacuum tube 320 is usually made of a flexible plastic material, the vacuum tube 320 may not be proper for installation of the pressure sensor 330. In this case, the vacuum tube 320 may be cut into parts, and a connection tube 340 make of a hard material may be installed between the parts. Then, the pressure sensor 330 may be installed on the connection tube 340.

The supporter 300 is installed almost vertically to have a certain height. As a result, a space in which the storage container 510 can be seated is provided between the vacuum depressurizer 400 connected to the upper portion of the supporter 300 and the seating surface of the mechanical operator 200, as described above.

The vacuum depressurizer 400 may be rotatably coupled to an upper end of the supporter 300 with a hinge 310. As a result, the vacuum depressurizer 400 may vertically move on a pivot of the upper end of the supporter 300. Accordingly, the storage container 510 may be conveniently seated on the mechanical operator 200 without being interrupted by the vacuum depressurizer 400.

According to an embodiment of the present invention, the supporter 300 may be installed such that the vertical length thereof is adjustable by a vertical connector 350. Thereby, the storage container 510 may be seated on the mechanical operator 200 by lifting the vertical connector 350 up, and thus the seating operation may not be interrupted by the vacuum depressurizer 400.

In addition, the height of the vacuum depressurizer 400 may be adjusted as desired by vertically moving the vertical connector 350. As a result, storage containers 510 having different volumes can be employed for the vacuum blender 100.

As shown in FIGS. 2 to 4, the vacuum depressurizer 400 includes a body 410 which is horizontally connected to the upper portion of the supporter 300. A first vacuum chamber 450 communicating with the vacuum tube 320 via a connection nozzle 440 is defined in the body 410. The upper and lower portions of the first vacuum chamber 450 communicate with the outside of the body 410. The upper portion of the first vacuum chamber 450 is selectively opened and closed by a first vacuum plug 430.

Accordingly, the first vacuum chamber 450 may be easily released from the vacuum state when the user lifts the first vacuum plug 430. To provide convenience in using the first vacuum plug 430, a grip 431 may be attached to an upper portion of the first vacuum plug 430 to allow the user to manually open and close the first vacuum plug 430 by holding the grip 431.

Moreover, the vacuum depressurizer 400 is provided with an accommodation groove 420 in which the first vacuum plug 430 is installed. The accommodation groove 420 is provided with an installation hole 411 into which the first vacuum plug 430 is inserted. One or more intake holes 412 which are selectively opened and closed by the first vacuum plug 430 may be formed around the installation hole 411. The first vacuum plug 430 may be fixedly inserted onto the installation hole 411. The intake holes 412 may communicate with the outside of the first vacuum plug 430 by slightly lifting the first vacuum plug 430 rather than completely removing the same from the body 410. As a result, the vacuum state may be easily released without inconveniently removing the first vacuum plug 430.

A depressurizer packing 470 may be mounted to a lower portion of the vacuum depressurizer 400 which communicates with the outside of the body 410, such that the depressurizer packing 470 can closely contact the seal lid 530. The depressurizer packing 470 functions to maintain the vacuum depressurizer 400 and the vacuum chopper 500 in a vacuum state during the processes of vacuum depressurization and vacuum chopping.

The vacuum chopper 500 includes a storage container 510 and a seal cover 530. The storage container 510 is seating on the mechanical operator 200 and provided with a second vacuum chamber 580 therein. A blender blade 515 connected with the rotary motor 214 is mounted to a lower portion of the storage container 510. The seal cover 530 is sealably placed on the storage container 510. A second vacuum plug 540 is installed at a part of the seal cover 530 which is sealably connected to the lower portion of the first vacuum chamber 450 of the vacuum depressurizer 400, such that the second vacuum plug 540 is selectively opened and closed.

To provide user convenience, a grip 520 is provided on one side of the storage container 510. The second vacuum chamber 580 defined in the storage container 510 provides a storage space for containing foods to be chopped.

The second vacuum chamber 580 may be simply released from the vacuum state when the user lifts the second vacuum plug 540. To provide convenience in using the second vacuum plug 540, a grip 541 may be attached to an upper portion of the second vacuum plug 540 to allow the user to manually open and close the second vacuum plug 540 by holding the grip 541, as shown in FIG. 5.

The central portion of the seal cover 530 is provided with an accommodation groove 550 in which the second vacuum plug 540 is installed. The accommodation groove 550 is provided with an installation hole 551 into which the second vacuum plug 540 is inserted. One or more intake holes 552 which are selectively opened and closed by the second vacuum plug 540 may be formed around the installation hole 551. The second vacuum plug 540 may be fixedly inserted onto the installation hole 551. The intake holes 552 may communicate with the outside of the second vacuum plug 540 by slightly lifting the second vacuum plug 540 rather than completely removing the same from the seal cover 530. As a result, the vacuum state may be easily released without inconveniently removing the second vacuum plug 540.

The vacuum blender according to the present invention needs to maintain the vacuum state while foods are chopped in the storage container 510. Accordingly, configuration of the packing for sealing the blender is very important. The present invention adopts a dual packing structure rather than a single packing structure, which is employed by typical blenders, such that the space between the storage container 510 and the seal cover 530 is completely sealed. This structure will be described in detail with reference to FIG. 6.

A step 511 is formed on the inner side of the upper portion of the storage container 510, and a first cover packing 560 is mounted to the lower portion of the seal cover 530 to closely contact the horizontal surface of the step 510. When vacuum is created, the seal cover 530 is pulled toward the second vacuum chamber 582 by a pressure difference. Accordingly, if the packing of the seal cover 530 closely contacts the vertical surface of the storage container 510, the seal cover 530 may be relatively easily separated by the force pulling the seal cover 513 toward the second vacuum chamber 580.

For this reason, the step 511 is provided to the storage container 510, and the first cover packing 560 is installed so as to closely contact the horizontal surface of the step 511 in the vertical direction. As a result, even if a force is applied to pull the first cover packing 560 toward the second vacuum chamber 580 in a vacuum state, the sealing effect may be maintained because the horizontal surface of the step 511 firmly supports the first cover packing 560.

In addition, a second cover packing 570 is installed at the lower portion of the seal cover packing 570 and positioned above the first cover packing 560 to closely contact the inner upper and lower surfaces of the storage container 510. The second cover packing 570 has a packing structure that is employed by typical blenders, and thus a detailed description thereof will be omitted.

The first cover packing 560 is installed between a first installation protrusion 533 and the second installation protrusion 532, and the second cover packing 570 is installed between the second installation protrusion 532 and a third installation protrusion 531. Accordingly, the first cover packing 560 and the second cover packing 570 are separated from each other, while being firmly installed rather than being displaced from the seal cover 530.

FIG. 7 specifically illustrates connection between the vacuum chopper 500 and the mechanical operator 200. When the storage container 510 of the vacuum chopper 500 is placed on the seating surface of the mechanical operator 200, a rotary plate 512 installed on the bottom surface of the storage container 510 is fitted into a rotary base 250, which is connected to the shaft of the rotary motor 240 installed on in the main body 210 of the mechanical operator 200, via a connection ring 260. A rotary shaft 514 is coupled to the rotary plate 512 via a bushing 513. The blender blade 515 is installed at an upper end of the rotary shaft 514 such that the blender blade 515 is positioned at an inner lower end of the storage container 510.

A bearing 516 for supporting rotation of the rotary shaft 514 and a lower packing 517 for sealing the storage container 510 are installed around the rotary shaft 514. The lower packing 517 preferably has a dual packing structure which serves to maintain the storage container 510 in a vacuum state. According to an embodiment of the present invention, a bidirectional packing may be installed as the lower packing 517 in order to enhance sealability.

Hereinafter, a brief description will be given of depressurization of the vacuum blender and release of vacuum created in the vacuum blender according to an embodiment, with reference to FIG. 9.

FIG. 9(a) illustrates airflow created around portions of the vacuum depressurizer 400 and the vacuum chopper 500 which are connected with each other in the vacuum depressurization process. When the vacuum pump 230 operates with the first vacuum chamber 450 of the vacuum depressurizer 400 sealed by the first vacuum plug 430, air is suctioned through the vacuum tube 320, and thus the first vacuum plug 430 is subjected to a downward pulling force. Thereby, the first vacuum plug 430 is caused to further closely contact the body 410 of the vacuum depressurizer 400 in the downward direction, and thus the sealing condition is maintained. Accordingly, external air cannot be introduced into the body 410 of the vacuum depressurizer 400.

On the other hand, when the vacuum pump 230 operates with the seal cover 530 of the vacuum chopper 500 sealed by the second vacuum plug 540, the second vacuum plug 540 is lifted up toward the first vacuum chamber 450, and thus air is allowed to flow. As a result, air is discharged from the second vacuum chamber 580 defined in the storage container 510 to the vacuum pump 230 through the first vacuum chamber 450. When a pressure lower than or equal to a certain depressurization level is reached by operating the vacuum pump 230, the first vacuum chamber 450 of the vacuum depressurizer 400 and the second vacuum chamber 580 of the vacuum chopper 500 are maintained in the same vacuum state.

FIG. 9(b) illustrates a process of releasing the vacuum state using the first vacuum plug 430. Under the vacuum condition established through the process of FIG. 9(a), the vacuum chopper 500 rotates the blender blade 515 to chop foods. In order to detach the storage container 510 from the vacuum blender 100 after the chopping process is completed, the vacuum state needs to be released. According to an embodiment of the present invention, the vacuum state may be simply released by slightly lifting the first vacuum plug 430 of the vacuum depressurizer 400. That is, the first vacuum chamber 450 is released from the vacuum state as air flows through the first vacuum plug 430.

On the other hand, the second vacuum plug 540 in the vacuum state is pulled toward the second vacuum chamber 580. Since the second vacuum plug 514 is caused to further closely contact the body of the seal cover 530 in the downward direction, the sealing condition is maintained. This operation is clearly distinguished from the operation of releasing the storage container from the vacuum state upon chopping foods in the conventional vacuum mixer disclosed in Reference 1. Therefore, foods chopped using the vacuum blender of the present invention may be kept fresh in a vacuum state for a long time even if the foods are not eaten immediately after the chopping operation.

Figure 10:
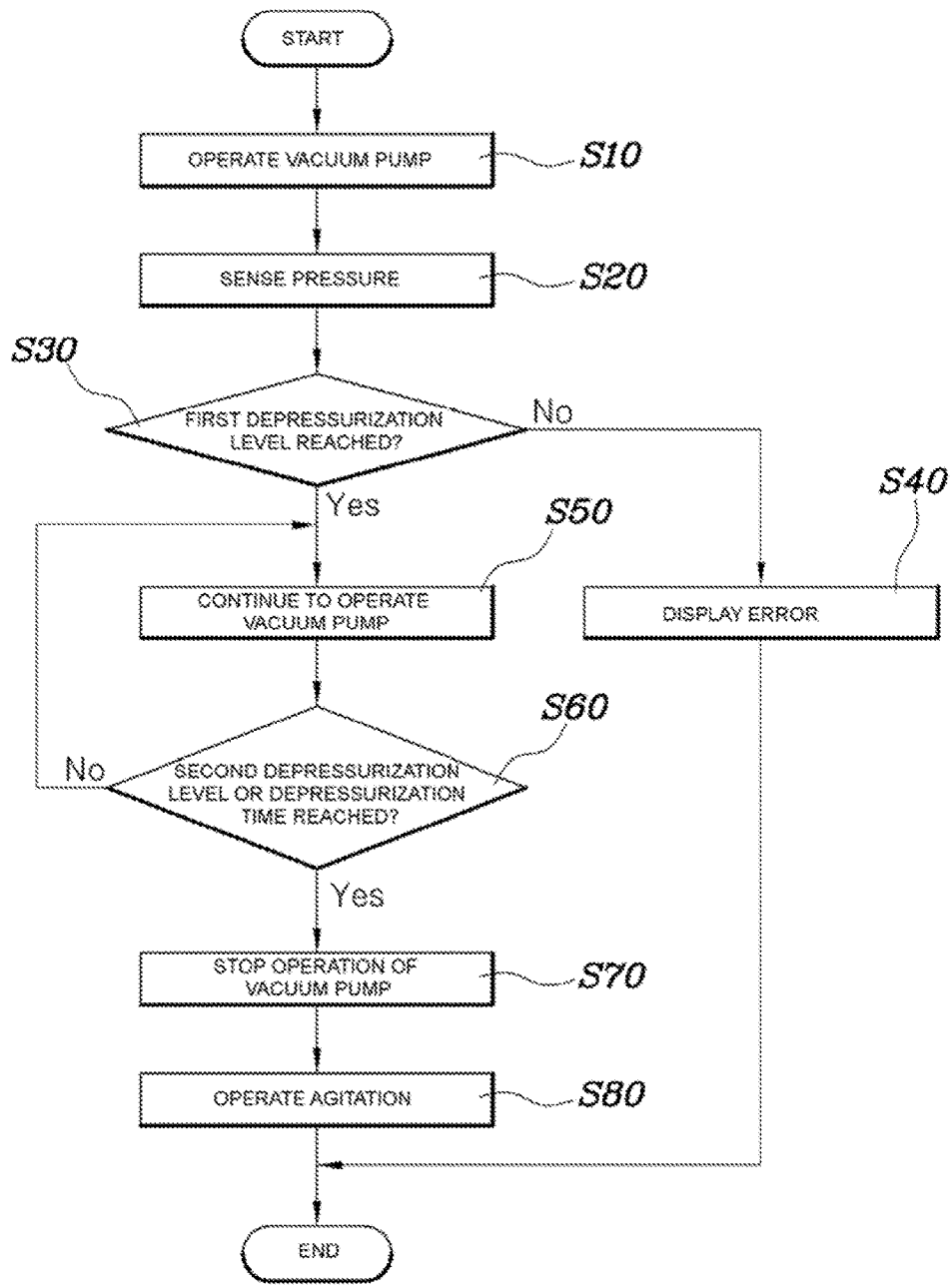
FIG. 10 is a flowchart illustrating a method for operating a vacuum blender according to an embodiment of the present invention.

Lastly, a method for operating the vacuum blender according to the present invention will be briefly described with reference to FIG. 10.

The method for operating the vacuum blender includes the steps of: depressurizing a sealed storage container using a vacuum pump (S10); determining, through a pressure sensor, whether a pressure in the storage container has reached a first depressurization level (S20, S30); continuing to operate the vacuum pump when the pressure in the storage container has reached the first depressurization level as a result of the determination (S50); determining whether the pressure in the storage container has reached a second depressurization level (S60); stopping operating the vacuum pump when the pressure in the storage container has reached the second depressurization level (S70); and chopping foods by rotating a blender blade installed in the storage container (S80).

According to the present invention, two depressurization levels are set to control operation of the vacuum pump as described above. Even if several packing structures are provided as described above, vacuum may not be normally created as the vacuum blender is worn out over time. Accordingly, if the vacuum pump continues to operate until the pressure reaches a certain depressurization level necessary for vacuum chopping without checking whether sealing is normally implemented, the vacuum pump may keep working without reaching the depressurization level, which may result in increasing costs and malfunctions.

For this reason, the present invention checks if the vacuum blender is normally sealed first. That is, if the interior of the vacuum blender reaches the first depressurization level when a certain time passes after the vacuum pump begins to operate, it may be determined that the vacuum blender is normally sealed. On the other hand, if the interior of the vacuum blender does not reach the first depressurization level when a certain time passes after the vacuum pump begins to operate, it may be determined that the vacuum blender is not normally sealed, and an error message is displayed to request an after service such as replacement of a packing (S40).

When the interior of the vacuum blend reaches the first depressurization level, the vacuum blender is normally sealed, and accordingly the vacuum pump continues to operate or re-operate to cause the interior of the blender to reach the second depressurization level which is most proper for vacuum chopping. Since the normal packing condition of the vacuum blender has been confirmed in the preliminary step, the interior of the vacuum blend will reach the second depressurization level as long as there is no malfunction caused.

The depressurization levels are determined in consideration of the capacity of the vacuum blender, performance of the vacuum pump, the rotational speed of the motor, and the like. Preferably, the first depressurization level is −40 KPa, and the second depressurization level is −70 KPa.

In this step, it may be checked whether the interior of the vacuum blender has reached the second depressurization level or whether a certain depressurization time has been reached. For example, once the second depressurization level, −70 KPa, is obtained 30 seconds after the first depressurization level, −50 KPa, is obtained, it is checked whether the interior of the back blender has reached the second depressurization level using a pressure sensor or whether 30 seconds has passed after the vacuum pump was operated with the first depressurization level obtained. In either case, the following steps are performed.

When the second depressurization level is obtained or the depressurization time is reached, operation of the vacuum pump is stopped to chop the foods. Stopping the operation of the vacuum pump and chopping the foods may be performed step by step according to an input of a separate control signal. In this case, chopping the foods may be stopped, if necessary, after vacuum is created.

On the other hand, stopping the operation of the vacuum pump and chopping the foods may be performed continuously without an input of a separate control signal. In this case, all the operations up to chopping of the foods are automatically performed without an additional separate manipulation, and accordingly user convenience may be enhanced Although the details such as specific constituents of the present invention, the embodiments and the drawings have been disclosed for illustrative purposes. It will be apparent to those skilled in the art that various modifications and variations can be made in the present invention based on the disclosure above.

Therefore it should be understood that the spirit of the present invention is not limited to the embodiments described above. Thus, it is intended that the present invention covers all modifications and variations of this invention provided they come within the scope of the appended claims and their equivalents.

100: Vacuum blender
200: Mechanical operator
300: Supporter
400: Vacuum depressurizer
500: Vacuum chopper

The invention claimed is:

1. A vacuum blender comprising:
a mechanical operator comprising a main body provided with an internal space, a vacuum pump and a rotary motor, the vacuum pump and the rotary motor being installed in the internal space of the main body;
a supporter configured to allow a vacuum tube connected with the vacuum pump to pass therethrough, the supporter being formed to rise to a certain height from the mechanical operator;
a vacuum depressurizer arranged at an upper portion of the supporter and provided therein with a first vacuum chamber connected with the vacuum tube, the first vacuum chamber being configured such that upper and lower portions thereof communicate with an outside, and the upper portion of the first vacuum chamber is a selectively opened and closed by a first vacuum plug; and
a vacuum chopper comprising a storage container seated on the mechanical operator and provided with a second vacuum chamber formed therein and a blender blade mounted thereto and connected with the rotary motor, and a seal cover sealably placed on the storage container and provided with a second vacuum plug installed at a portion of the seal cover sealably connected with a lower portion of the first vacuum chamber of the vacuum depressurizer such that the second vacuum plug is selectively opened and closed.

2. The vacuum blender according to claim 1, wherein a pressure sensor is installed on the vacuum tube.

3. The vacuum blender according to claim 1, wherein the supporter is installed such that a vertical length thereof is adjustable by a vertical connector.

4. The vacuum blender according to claim 1, wherein the vacuum depressurizer is pivotably coupled to an upper end of the supporter using a hinge.

5. The vacuum blender according to claim 1, wherein a grip is attached to an upper portion of the first vacuum plug to allow the first vacuum plug to be manually opened and closed.

6. The vacuum blender according to claim 5, wherein the vacuum depressurizer is provided with an installation hole allowing the first vacuum plug to be inserted thereinto and one or more intake holes arranged around the installation hole and selectively opened and closed by the first vacuum plug.

7. The vacuum blender according to claim 1, wherein a depressurizer packing is mounted to a lower portion of the vacuum depressurizer communicating with the outside so as to closely contact the seal cover.

8. The vacuum blender according to claim 1, wherein a grip allowing the second vacuum plug to be manually opened and closed is attached to an upper portion of the second vacuum plug.

9. The vacuum blender according to claim 8, wherein the seal cover is provided with an installation hole allowing the second vacuum plug to be inserted thereinto and one or more intake holes arranged around the installation hole and selectively opened and closed by the second vacuum plug.

10. The vacuum blender according to claim 1, wherein a step is formed on an inner side of an upper portion of the storage container, and a first cover packing is mounted to a lower portion of the seal cover so as to closely contact a horizontal surface of the step.

11. The vacuum blender according to claim 10, wherein a second cover packing is mounted to the lower portion of the seal cover and positioned above the first cover packing so as to closely contact inner upper and lower surfaces of the storage container.

\* \* \* \* \*